United States Patent
Glahn et al.

(10) Patent No.: US 8,256,576 B2
(45) Date of Patent: *Sep. 4, 2012

(54) ON-DEMAND LUBRICATION SYSTEM FOR IMPROVED FLOW MANAGEMENT AND CONTAINMENT

(75) Inventors: Jorn A. Glahn, Manchester, CT (US); Denman H. James, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/032,157

(22) Filed: Feb. 22, 2011

(65) Prior Publication Data

US 2011/0155508 A1    Jun. 30, 2011

Related U.S. Application Data

(63) Continuation of application No. 12/001,661, filed on Dec. 12, 2007, now Pat. No. 7,931,124.

(51) Int. Cl.
*F01D 25/18* (2006.01)
(52) U.S. Cl. .......................... 184/6.11; 184/7.4
(58) Field of Classification Search .............. 184/6.11, 184/6.12, 7.4; 60/39.092
See application file for complete search history.

(56) References Cited

U.S. PATENT DOCUMENTS

| | | | |
|---|---|---|---|
| 2,511,150 A | 6/1950 | Edwards | |
| 2,672,010 A | 3/1954 | Newcomb | |
| 2,672,278 A | 3/1954 | Newcomb | |
| 3,067,693 A | 12/1962 | Lambeck | |
| 3,527,054 A | 9/1970 | Hemsworth | |
| 3,527,430 A | 9/1970 | Smith | |
| 3,952,503 A | 4/1976 | Fox et al. | |
| 4,205,525 A | 6/1980 | Hamburg et al. | |
| 5,152,141 A | 10/1992 | Rumford et al. | |
| 5,214,984 A | 6/1993 | Sano | |
| 5,411,116 A | 5/1995 | Kish et al. | |
| 5,513,732 A | 5/1996 | Goates | |
| 6,094,907 A | 8/2000 | Blackner | |
| 6,470,666 B1 | 10/2002 | Przytulski et al. | |
| 6,564,556 B2 | 5/2003 | Ginter | |
| 6,695,590 B1 * | 2/2004 | Rydin et al. | 417/63 |
| 6,877,950 B2 | 4/2005 | Liu | |
| 7,163,086 B2 | 1/2007 | Care et al. | |
| 2001/0047647 A1 | 12/2001 | Cornet | |
| 2005/0166570 A1 | 8/2005 | Granitz et al. | |
| 2007/0169997 A1 | 7/2007 | Delaloye | |

FOREIGN PATENT DOCUMENTS

| | | |
|---|---|---|
| EP | 0694120 B1 | 5/2001 |
| JP | 6307325 A | 11/1994 |
| WO | WO 94/08176 A1 | 4/1994 |

OTHER PUBLICATIONS

"Hydrostatic Pumps", from http://www.hydraulic-equipment-manufacturers.com/hydraulic-articles.html, visited Oct. 18, 2007 (10 pages).

* cited by examiner

*Primary Examiner* — Michael Mansen
*Assistant Examiner* — Robert T Reese
(74) *Attorney, Agent, or Firm* — Kinney & Lange, P.A.

(57) ABSTRACT

An oil circulation system for a gas turbine engine includes a variable displacement scavenge pump for pumping oil, a first actuator for controlling displacement of the scavenge pump, a variable displacement pressure pump for pumping oil, a second actuator for controlling displacement of the pressure pump, and a drive shaft. Both the scavenge pump and the pressure pump are driven by the drive shaft.

19 Claims, 6 Drawing Sheets

ON-DEMAND LUBRICATION SYSTEM FOR IMPROVED FLOW MANAGEMENT AND CONTAINMENT

CROSS-REFERENCE TO RELATED APPLICATION(S)

This application is a continuation of U.S. patent application Ser. No. 12/001,661, filed Dec. 12, 2007 (now U.S. Pat. No. 7,931,124).

BACKGROUND

The present invention relates to lubrication flow management and containment systems for gas turbine engines.

Gas turbine engines generally use oil to lubricate and cool engine components during operation, though there is typically a need to separate the oil from certain regions of the gas turbine engine in order to reduce a risk of auto-ignition (i.e., oil fires) in relatively high-temperature areas. A typical prior art lubrication system utilizes a scavenge pump and a pressure pump, with the pressure pump delivering oil from a storage tank to desired engine locations and the scavenge pump delivering oil from these engine locations to the storage tank. A heat exchanger can be used to remove excess thermal energy from the oil before delivery to the storage tank. Both the pressure pump and the scavenge pump have fixed displacements and are both driven by a common drive shaft powered by engine operation at a fixed ratio via a gearbox. The pressure pump and the scavenge pump are stacked on top of each other on the drive shaft in order to save space and weight. Such a configuration is also considered desirable in the art because the use of a common drive shaft to power both the pressure pump and the scavenge pump ensures that a loss of power to or seizure of the scavenge pump will likewise halt operation of the pressure pump. This ensures that oil will not be pumped to engine locations and left there to accumulate, thereby causing flooding and an elevated risk of auto-ignition.

Air curtains are often used to contain oil within pressurized engine compartments. Oil that leaks out of such pressurized compartments can be problematic, for instance, with aerospace applications, leaking oil can be a nuisance by causing unpleasant odors in airplane passenger areas. It can be particularly difficult to maintain sufficient air curtains to contain oil in pressurized compartments across all engine operating conditions, particularly at relatively low-power settings (e.g., ground idle conditions) when scavenge pump operation does not generate adequate suction to maintain air curtains.

SUMMARY

An oil circulation system for a gas turbine engine according to the present invention includes a variable displacement scavenge pump for pumping oil, a first actuator for controlling displacement of the scavenge pump, a variable displacement pressure pump for pumping oil, a second actuator for controlling displacement of the pressure pump, and a drive shaft. Both the scavenge pump and the pressure pump are driven by the drive shaft.

DETAILED DESCRIPTION

The present invention provides a system and method for lubricant distribution and containment in a gas turbine engine. More particularly, the present invention involves the use of variable flow output pumps to dynamically adjust lubricant flow between storage and desired delivery locations in the engine. Furthermore, the present invention enables flow output of a scavenge (or suction) pump to be adjusted independent from flow output of a pressure (or delivery) pump, enabling the scavenge pump to generate a selected level of suction to evacuate and negatively pressurize a compartment at a desired lubricant delivery location in the engine, thereby reducing a risk of undesired lubricant leaks from the compartment.

Figure 1:
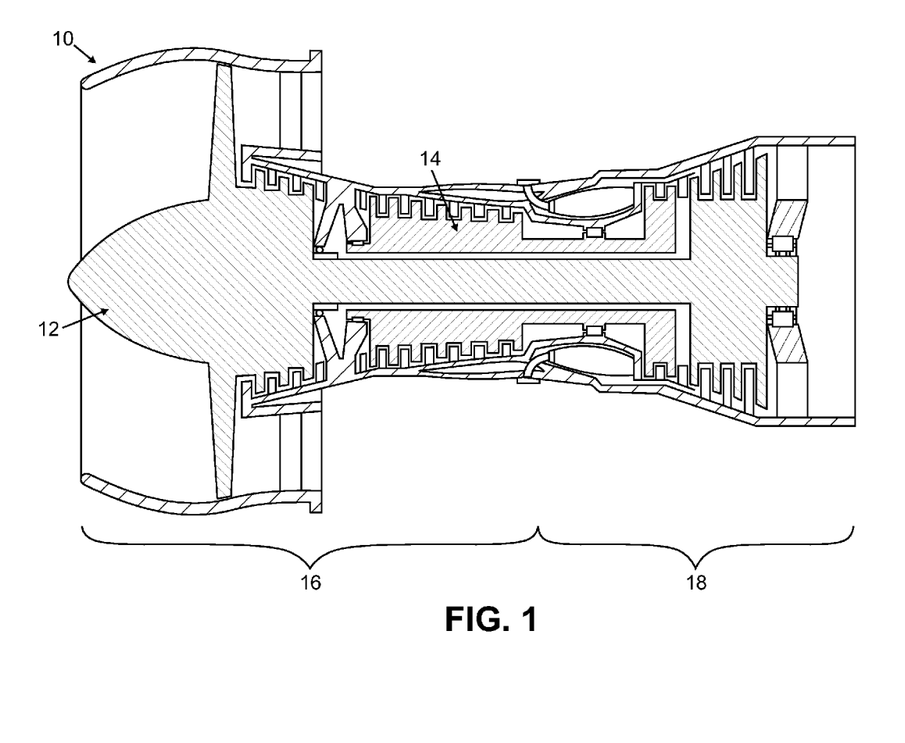
FIG. 1 is a cross-sectional view of a gas turbine engine.

FIG. 1 is a cross-sectional view of an exemplary gas turbine engine 10, which in the illustrated embodiment is a high-bypass ratio type engine commonly used for commercial aerospace application. It should be recognized that the engine 10 is shown by way of example and not limitation, and the present invention can be utilized with any type of gas turbine engine. In general, the illustrated engine 10 includes a first spool 12 and a second spool 14, and defines a cold section 16 and a hot section 18. The operation of gas turbine engines is well known in the art, and therefore further explanation of their operation is unnecessary here.

Figure 2:
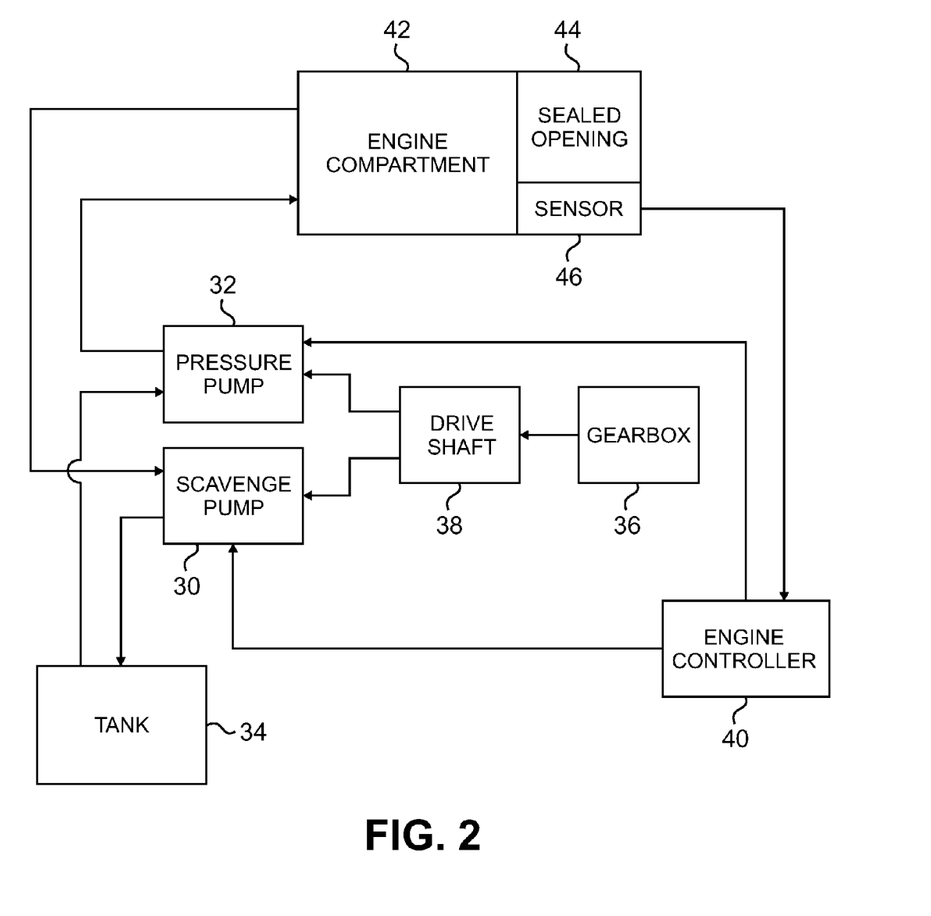
FIG. 2 is a block diagram showing a lubricant distribution and containment system of the gas turbine engine.

FIG. 2 is a block diagram showing one embodiment of a lubricant distribution and containment system for use in the gas turbine engine 10. The illustrated system includes a scavenge pump 30, a pressure pump 32 and a tank 34. A gearbox 36 is powered by operation of the gas turbine engine 10, that is, by the rotation of at least one of the spools 12 and 14. Power is transmitted from the gearbox 36 to the scavenge pump 30 and to the pressure pump 32 by a drive shaft 38. An engine controller 40 can generate control signals for controlling operation of the scavenge pump 30 and the pressure pump 32. Also shown in FIG. 2 is an engine compartment 42 having a sealed opening 44 that enables a movable component, such as a rotatable shaft, to pass through a wall of the compartment 42. Sealing at the opening 44 can be provided by a labyrinth seal, or other suitable sealing structure of a known configuration. It should be noted that the system can include additional components that are not shown in FIG. 2 for simplicity.

The pressure pump 32 moves a fluid such as oil or other lubricant and/or coolant, to the engine compartment 42 from the tank 34, which acts as a reservoir. The scavenge pump 30 moves oil from the engine compartment back to the tank 34. The oil can pass through a heat exchanger (not shown) before returning to the tank 34, in order to remove thermal energy from the oil that was absorbed in the compartment 42. In this way, oil moves in a circuit between the compartment 42 and the tank 34, which can remove thermal energy from the compartment 42 where heat-sensitive and friction-sensitive components like bearings are typically located.

During operation, the engine compartment 42 is negatively pressurized, creating a partial vacuum, for instance decreasing pressure in the compartment 42 by up to about a 3447.4 pascals (Pa) differential (0.5 pounds per square inch differential (psid)) at low power engine operation, e.g., idle conditions. This negative pressurization of the compartment 42 creates an air curtain at the opening 44, which reduces a risk of oil (e.g., oil droplets) leaking from the compartment 42 through the sealed opening 44.

In the illustrated embodiment, the scavenge pump 30 and the pressure pump 32 are each variable positive displacement pumps (e.g., variable displacement ring pumps, vane pumps, etc.), and the drive shaft 38 provides rotational input to both the pumps 30 and 32 when the engine 10 is operating. The amount of rotational input provided to the pumps 30 and 32 by the drive shaft 38 can be proportional to operational speed of the spools 12 and 14 of the engine 10 as determined by a gear ratio of the gearbox 36. However, fluid outputs of each of the pumps 30 and 32 can be varied, by adjusting displacement of each pump 30 and 32 according to command signals from the engine controller 40, as explained further below.

In an alternative embodiment, the pressure pump 32 and/or the scavenge pump 30 can be electrically powered pumps. In this embodiment, the configuration can be generally similar to that shown in FIG. 2, but the drive shaft 38 and the gearbox 36 can be omitted. Electrical power to the pumps 30 and 32 can be supplied by a conventional generator known for use with gas turbine engines. The generator can be an existing one present in the engine 10 used for other functions, with the generator having an output capacity selected to accommodate the additional electrical power requirements of the pumps 30 and 32, or can be an additional generator dedicated to providing electrical power to the pumps 30 and 32.

Figure 3:
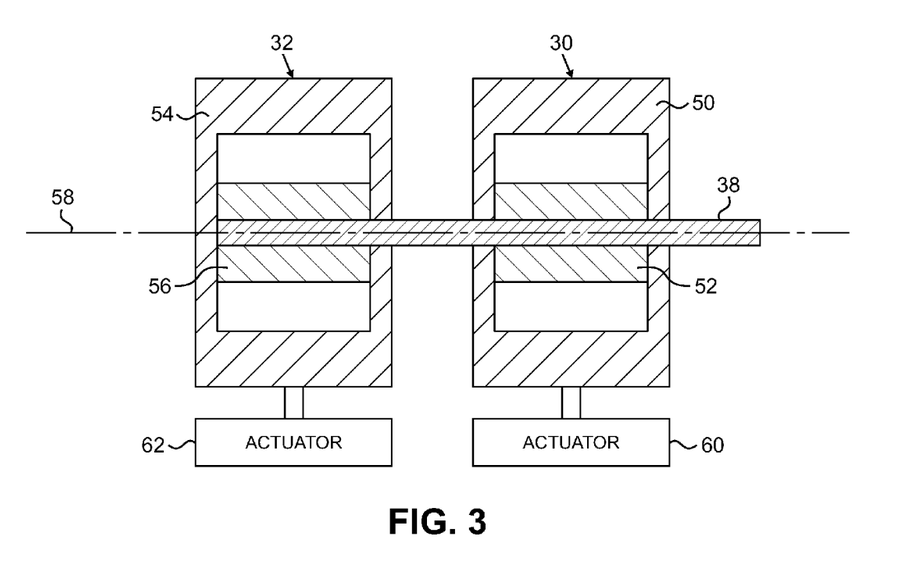
FIG. 3 is a cross-sectional view of a portion of an embodiment of the lubricant distribution and containment system.
Figure 4:
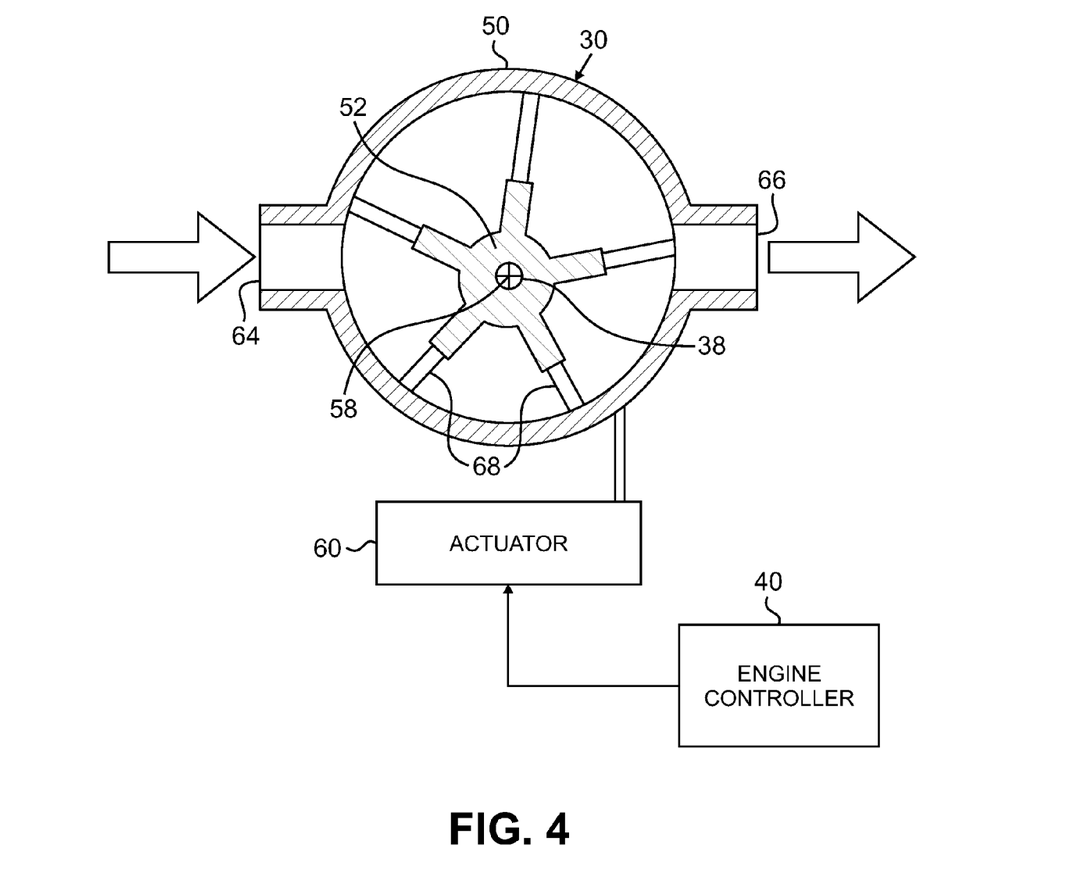
FIG. 4 is a cross-sectional view of an embodiment for a pump of the lubricant distribution and containment system.

FIGS. 3 and 4 are cross-sectional views of portions of an embodiment of the lubricant distribution and containment system of the present invention using mechanically-powered variable displacement pumps. FIG. 3 is a cross-sectional view of a portion of the system, and FIG. 4 is another cross-sectional view of a portion of the system taken perpendicular to the view shown in FIG. 3.

As shown in FIG. 3, the scavenge pump 30 and the pressure pump 32 are arranged in a stacked configuration on the common drive shaft 38. The scavenge pump 30 can be arranged closer to the gearbox 36 (not shown in FIG. 3) than the pressure pump 32. This stacked arrangement helps conserve space and weight. The stacked arrangement also provides an additional safety benefit in that the common drive shaft 38 provides rotational input to both the scavenge pump 30 and the pressure pump 32, therefore a pump seizure or loss of rotational power causes both pumps 30 and 32 to halt, reducing a risk of flooding of the engine compartment 42 and associated risks of auto-ignition.

The illustrated scavenge pump 30 includes a housing 50 and a rotor 52 positioned within the housing 50. The illustrated pressure pump 32 is substantially similar to the scavenge pump 30, and includes a housing 54 and a rotor 56. The rotors 52 and 56 are both connected to the drive shaft 38, and can rotate about an axis 58. The housings 50 and 54 are connected to actuators 60 and 62 (e.g., solenoid actuators, hydraulic actuators, etc.), respectively, that can independently reposition the housings 50 and 54 relative to the axis 58 about which the rotors 52 and 56 can rotate. The actuators 60 and 62 can each be controlled by command signals from the engine controller 40 (not shown in FIG. 3).

Operation of the pumps 30 and 32 can further be understood with respect to FIG. 4, which shows the scavenge pump 30. The pressure pump 32 is configured similarly to the scavenge pump 30, and so description of internal workings of the scavenge pump 30 applies equally to the pressure pump 32. The housing 50 includes an inlet port 64 and an outlet port 66 through which oil can flow. The rotor 52 is positioned within an interior chamber of the housing 50, and is powered by rotational input from the drive shaft 38. The drive shaft 38 and the rotor 52 rotate about the fixed axis 58. A plurality of vanes 68 extend radially outward from the rotor 52 to an interior surface of the housing 50. In response to command signals from the engine controller 40, the housing 50 can be repositioned by the actuator 60 relative to the axis 58. This means that the housing 50 is positioned eccentrically relative to the rotor 52 and vanes 68 to provide variable displacement of fluid pumped from the inlet port 64 to the outlet port 66. The vanes 68 can flex, telescope or otherwise adjust to follow the interior surface of the housing 50 as the rotor 52 rotates, in order to accommodate various positioning of the housing 50. The command signals sent by the engine controller 40 to the actuator 60 can be selected according to a fixed schedule determined as a function of throttle level, or can be dynamically adjusted using feedback from an optional sensor 46 (FIG. 2) that detects operational parameters at the compartment 42. It should be noted that the specific number of vanes 68 can vary as desired for particular applications, as can the overall size of the scavenge pump 30.

The present invention allows flow output of the scavenge pump 30 and the pressure pump 32 to be independently dynamically adjusted to maintain desired oil flow and oil containment across a variety of operational conditions. The present invention allows oil flow to the compartment 42 to be selected according to relatively precise requirements for particular engine operational speeds, thereby increasing efficiency. Adjustment of the displacement of the scavenge pump 30 independent from (or decoupled from) the pressure pump 32 according to the present invention also allows adjustment of suction provided to the location where the scavenge pump 30 draws fluid, namely the engine compartment 42, in order to better maintain air curtains and to generally enhance oil containment. In addition, the present invention provides a relatively low-weight pumping system, and, in some embodiments, can utilize a common drive shaft for added safety.

The actuator 60 for the scavenge pump 30 can be adjusted separately from the actuator 62 for the pressure pump 32. By increasing the displacement of the scavenge pump 30 at a greater rate than that of the pressure pump 32, that is, at a rate of change ratio greater than 1:1, the suction provided by the scavenge pump 30 to evacuate the engine compartment 42 can be increased while still delivering an adequate oil flow with the pressure pump 32. It should be noted that the flow output of the scavenge pump 30 may always remain greater than that of the pressure pump 32, such as at a 2:1 ratio, in order to avoid flooding in the engine compartment 42 and to reduce a risk of auto-ignition of the oil. However, the present invention allows adjustment of flow outputs of the pressure pump 32 and the scavenge pump 30 to be adjusted at different rates, that is, adjusted independently. For instance, the flow output ratio between the scavenge pump 30 and the pressure pump 32 can change from 2:1 to 3:1 under certain operating conditions. The particular rate of change in flow outputs can be selected as a function of desired fluid delivery and removal rates, desired compartment pressurization, among other factors. The particular conditions at which the displacement of the scavenge pump 30 is increased over that of the pressure pump 32 can be selected as desired for particular applications. For instance, at relatively low engine operational speeds it may be desirable to increase displacement of the scavenge pump 30 over that of the pressure pump 32, which can operate at a relatively lower displacement matched to the relatively low oil flow demands associated with such engine operational speeds.

Figure 5:
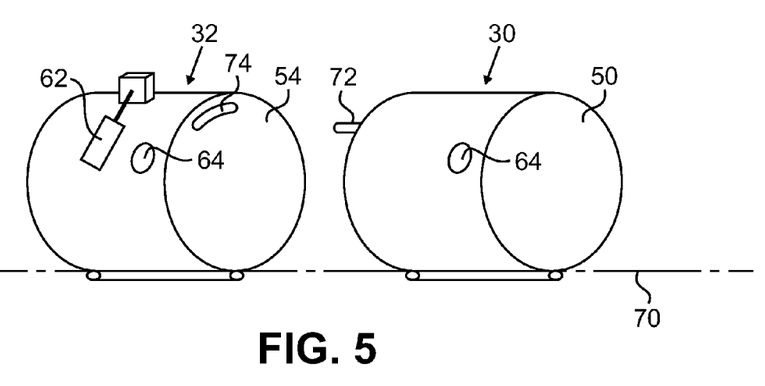
FIG. 5 is an exploded perspective view of a portion of an embodiment of the lubricant distribution and containment system.

A mechanical structure can be provided to ensure that flow outputs of the scavenge pump 30 and the pressure pump 32 never drop below a 1:1 ratio, that is, so the flow output of the scavenge pump 30 never drops below that of the pressure pump 32. FIG. 5 is an exploded perspective view of a portion of an embodiment of the lubricant distribution and containment system with a mechanical linkage assembly between the scavenge pump 30 and the pressure pump 32. The housings 50 and 54 for the scavenge pump 30 and the pressure pump 32, respectively, are each pivotally supported at a bottom dead center location aligned along a common axis 70. The mechanical linkage assembly in the illustrated embodiment includes a pin 72 extending from the housing 50 of the scavenge pump 30 and a corresponding arcuate slot 74 located in the housing 54 of the pressure pump 32. In an assembled configuration, the pin 72 is inserted into the slot 74. In this configuration, actuation by the actuator 62 can cause the pin 72 to move within the slot 74 within a selected range of movement. It should be noted that in alternative embodiments, the pin 72 can be located on the housing 54 and the slot 74 on the housing 50.

Figure 6A:
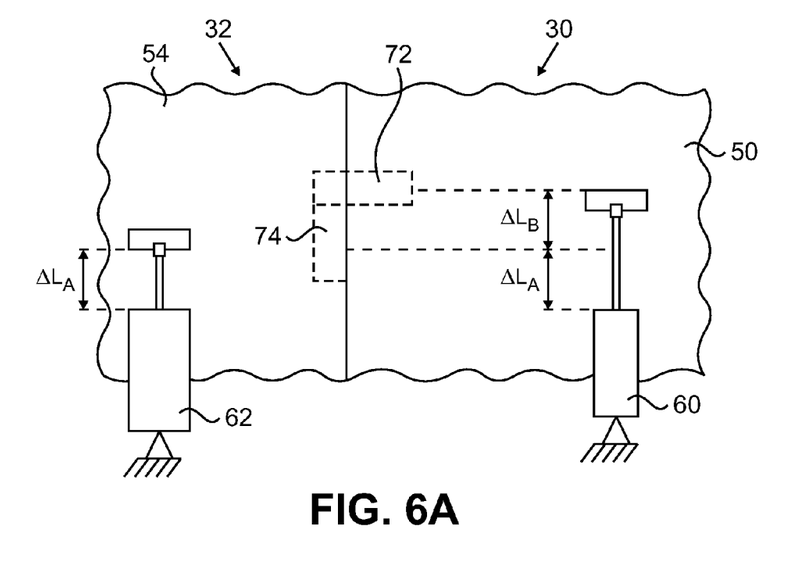
FIGS. 6A-6C are views of alternative embodiments of actuation and mechanical linkage assemblies for the lubricant distribution and containment system.
Figure 6B:
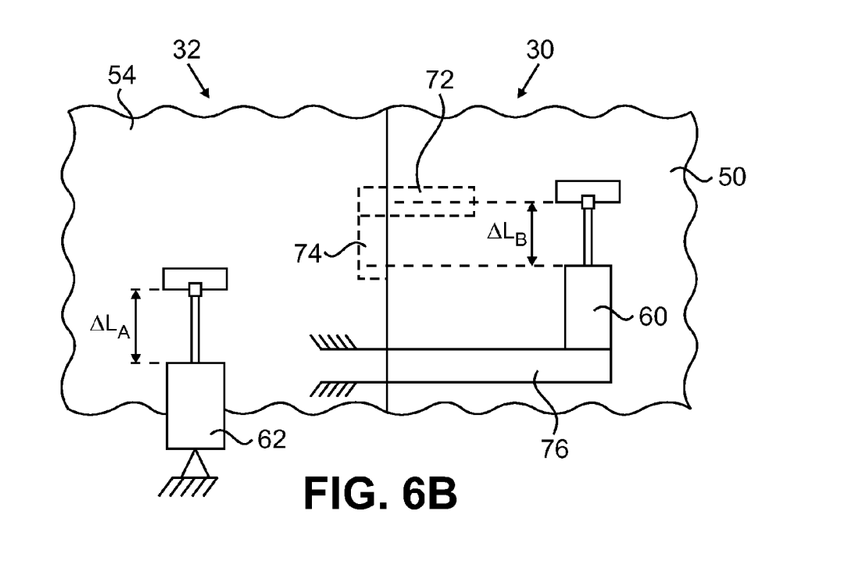
Figure 6C:
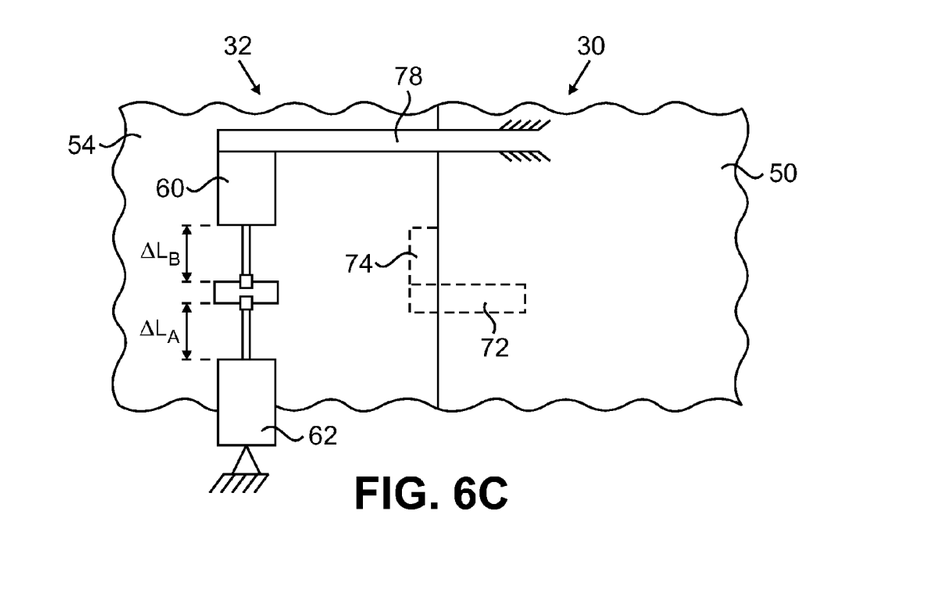

FIGS. 6A-6C are views of alternative embodiments of actuation and mechanical linkage assemblies for the lubricant distribution and containment system. FIG. 6A illustrates a first embodiment where the actuator 60 connected to the housing 50 of the scavenge pump 30 is mounted to an external "ground" location, and the actuator 62 connected to the housing 54 of the pressure pump 32 is mounted to an external "ground" location. Here, actuation of the actuator 62 moves both the housings 50 and 54, because the pin 72 will contact a circumferential extent of the slot 74. An additional actuation stroke can be achieved for the scavenge pump 30, as desired, through actuation of the actuator 60. Thus, the actuation stroke of the actuator 62 for the pressure pump 32 is $\Delta L_A$ and the actuation stroke of the actuator 60 for the scavenge pump 30 is $\Delta L_A + \Delta L_B$. It should be noted that in FIG. 6A, the actuator 60 is shown in a fully extended state with $\Delta L_B$ at its maximum and the pin 72 at one end of the slot 74. Actuation of the actuator 60 can reduce $\Delta L_B$ to zero, with the pin 72 moving to the opposite end of the slot 74.

FIG. 6B illustrates a second embodiment where the actuator 62 connected to the housing 54 of the pressure pump 32 is mounted to an external "ground" location and the actuator 60 for the scavenge pump 30 is supported by a beam (or support bracket) 76 extending from the housing 54 of the pressure pump 32. Similar to the embodiment of FIG. 6A, the actuation stroke of the actuator 62 for the pressure pump 32 is $\Delta L_A$ and the actuation stroke of the actuator 60 for the scavenge pump 30 is $\Delta L_A + \Delta L_B$. Though in the embodiment of FIG. 6B, the movement of the housing 54 causes movement of the beam 76, which displaces the actuator 60 and in turn the housing 50. It should be noted that in FIG. 6B, the actuator 60 is shown in a fully extended state with $\Delta L_B$ at its maximum.

FIG. 6C illustrates a third embodiment where the actuator 62 connected to the housing 54 of the pressure pump 32 is mounted to an external "ground" location and the actuator 60 is mounted between the housing 54 of the pressure pump 32 and a beam (or support bracket) 78 extending from the housing 50 of the scavenge pump 30. In this configuration, the actuators 60 and 62 are arranged to oppose one another. In this embodiment, the actuation stroke of the actuator 62 for the pressure pump 32 is $\Delta L_A$ and the actuation stroke of the actuator 60 for the scavenge pump 30 is $\Delta L_A + \Delta L_B$. It should be noted that in FIG. 6C, the actuator 60 is shown in a fully extended state with $\Delta L_B$ at its maximum.

It will be recognized by those of ordinary skill in the art that control of the actuators 60 and 62 can vary as desired for particular applications.

Although the present invention has been described with reference to preferred embodiments, workers skilled in the art will recognize that changes may be made in form and detail without departing from the spirit and scope of the invention. For instance, the particular fluid circulated by the system of the present invention can be any suitable coolant or lubricant.

The invention claimed is:

1. An oil circulation system for a gas turbine engine, the system comprising:
a variable displacement scavenge pump for pumping oil;
a first actuator for controlling displacement of the scavenge pump;
a variable displacement pressure pump for pumping oil;
a second actuator for controlling displacement of the pressure pump;
a drive shaft, wherein both the scavenge pump and the pressure pump are driven by the drive shaft; and
a mechanical linkage operably connected between the scavenge pump and the pressure pump configured to make displacement of the scavenge pump at least as great as displacement of the pressure pump, wherein the linkage permits displacement of the scavenge pump to exceed displacement of the pressure pump.

2. The system of claim 1, wherein the scavenge pump is a variable displacement vane pump.

3. The system of claim 1, wherein displacement of the scavenge pump is selected as a function of a speed of the drive shaft.

4. The system of claim 1 and further comprising:
a gearbox, wherein the gearbox is configured to transmit power from a spool of the gas turbine engine to the drive shaft.

5. An oil circulation system for a gas turbine engine, the system comprising:
a compartment where oil is utilized;
a pressure pump for pumping oil to the compartment;
a scavenge pump for pumping oil out of the compartment, wherein a pumping rate of the scavenge pump is variable, wherein the pumping rate of the scavenge pump is selected as a function of engine operating speed, and wherein the pumping rate of the scavenge pump is greater than a pumping rate of the pressure pump.

6. The system of claim 5 and further comprising:
a drive shaft, wherein both the scavenge pump and the pressure pump are commonly driven by the drive shaft, and wherein the drive shaft extends through both the scavenge pump and the pressure pump.

7. The system of claim 6, wherein the pumping rate of the pressure pump is variable.

8. The system of claim 7, wherein the scavenge pump and the pressure pump are operably linked such that the pumping rate of the scavenge pump is at least as great as the pumping rate of the pressure pump.

9. The system of claim 8, wherein the scavenge pump and the pressure pump are operatively linked with a pin and slot mechanical linkage that governs relative pivotal positions of respective housings of the scavenge pump and the pressure pump with respect to a common pivot axis.

10. The system of claim 8 and further comprising:
a first actuator connected to the scavenge pump; and a second actuator connected to the pressure pump, wherein the first and second actuators are independently adjustable.

11. The system of claim 10, wherein the first and second actuators are arranged in an opposing relationship.

12. The system of claim 5, wherein the scavenge pump is a variable displacement vane pump having displacement controlled by an actuator, and wherein adjustment of the displacement with the actuator controls the pumping rate of the scavenge pump.

13. The system of claim 5 and further comprising:
an oil tank, wherein the scavenge pump moves oil to the tank from the compartment, and wherein the pressure pump moves oil from the tank to the compartment.

14. An oil circulation system for a gas turbine engine, the system comprising:
a tank;
a compartment;
a variable displacement scavenge pump for pumping oil from the compartment to the tank;
a first actuator for controlling displacement of the scavenge pump;
a variable displacement pressure pump for pumping oil from the tank to the compartment;
a second actuator for controlling displacement of the pressure pump;
a drive shaft, wherein both the scavenge pump and the pressure pump are commonly driven by the drive shaft;
a mechanical linkage operably connected between the scavenge pump and the pressure pump configured to make displacement of the scavenge pump at least as great as displacement of the pressure pump, wherein the linkage permits displacement of the scavenge pump to exceed displacement of the pressure pump.

15. The system of claim 14, wherein the scavenge pump is a variable displacement vane pump.

16. The system of claim 14, wherein displacement of the scavenge pump is selected as a function of a speed of the drive shaft.

17. The system of claim 14 and further comprising:
a gearbox, wherein the gearbox is configured to transmit power to the drive shaft.

18. The system of claim 14, wherein the first and second actuators are arranged in an opposing relationship.

19. The system of claim 14, wherein the mechanical linkage comprises a pin and slot assembly that governs relative pivotal positions of respective housings of the scavenge pump and the pressure pump with respect to a common pivot axis.

* * * * *